United States Patent [19]

Sasaki

[11] 4,438,733
[45] Mar. 27, 1984

[54] AIR COOLED INTERNAL COMBUSTION ENGINE

[75] Inventor: Yoshihiro Sasaki, Katano, Japan

[73] Assignee: Yanmar Diesel Engine Co., Ltd., Osaka, Japan

[21] Appl. No.: 231,909

[22] Filed: Feb. 5, 1981

[30] Foreign Application Priority Data

Feb. 5, 1980 [JP] Japan ................. 55-12616

[51] Int. Cl.$^3$ ............................. F01P 1/08
[52] U.S. Cl. ..................... 123/41.62; 123/41.65; 123/198 E; 181/213; 181/264; 181/204
[58] Field of Search ............... 123/41.6, 41.61, 41.62, 123/41.65, 41.69, 41.7, 198 E; 181/264, 204, 281, 227, 228, 213, 212

[56] References Cited

U.S. PATENT DOCUMENTS

| 1,555,807 | 9/1925 | Burtnett | 123/41.6 |
| 2,758,580 | 8/1956 | Balzer | 123/41.67 |
| 2,771,862 | 11/1956 | Altman et al. | 123/41.67 |
| 2,862,485 | 12/1958 | Skinner | 123/90.6 |
| 3,521,726 | 7/1970 | Freyn | 123/198 E |
| 3,855,976 | 12/1974 | Notaras et al. | 123/41.62 |
| 3,863,734 | 2/1975 | Pawlina | 181/264 |

FOREIGN PATENT DOCUMENTS

1174509 3/1959 France ................. 181/212

Primary Examiner—William A. Cuchlinski, Jr.
Attorney, Agent, or Firm—Armstrong, Nikaido, Marmelstein & Kubovcik

[57] ABSTRACT

Disclosed is an air cooled internal combustion engine which comprises a cooling fan formed unitarily on a flywheel fixed to one end of an engine crank shaft, a cooling fan case covering the cooling fan and adapted to guide the flow of cooling air generated by the cooling fan toward the engine body, an air cleaner connected to the suction port of the engine, and a silencer connected to the exhaust port of the engine, wherein the suction port is located at the same side of the engine body as the flywheel while the other exhaust port is located at the opposite side of the engine body to the flywheel, and wherein the air cleaner is formed integrally with the cooling fan case.

9 Claims, 26 Drawing Figures

AIR COOLED INTERNAL COMBUSTION ENGINE

BACKGROUND OF THE INVENTION

The present invention relates to an air cooled internal combustion engine and, more particularly, to an air cooled internal combustion engine the size of which is reduced without being accompanied by deterioration of the engine performance.

Generally speaking, an air cooled single cylinder internal combustion engine for general purposes has a cooling fan provided unitarily with a flywheel, so that the cooling fan case covering this cooling fan is located at the same side as the flywheel. Therefore, the suction side air cleaner for introducing fresh air and the exhaust silencer of the engine are disposed at the opposite side of the engine to the valve actuating mechanism such as cam shaft and so forth and are directed in the same directions. On the other hand, in order to meet the demand for reducing the size of the engine, the air cleaner and the silencer, which are directed in the same direction, are arranged to make an interference with each other.

For this reason, the air cleaner and the silencer are allowed to have only limited capacities resulting in a correspondingly reduced engine performance.

Also, the cooling air induced by the cooling fan has to be delivered to both of the cylinder head and the cylinder block, without concentrating to either one. In order that this air is sufficiently distributed to both of the cylinder head and the cylinder block, the size of the mechanism is increased inevitably due to restriction of the positions of intake and exhaust ports, to undesirably hinder the reduction of the size of the engine.

Usually, the push rod cover which covers the push rods for pushing up valve arms for opening and closing the intake and exhaust valves is formed separately from the cylinder block. Therefore, the number of parts is inconveniently increased to make it difficult to reduce the engine size and, in addition, there is a tendency that oil is undesirably leaked through the upper and lower seal portions between the cylinder block and the cylinder head.

Due to the limitation of the mounting space, the silencer attached to the exhaust port is usually mounted to largely project to the outside of the engine, which not only hinders the reduction of engine size but also poses a problem concerning the mechanical strength.

In case of a diesel engine, it is a common measure to dispose the tappet for actuating a fuel injection pump between the tappet for intake valve and the tappet for exhaust valve, in order to reduce the length of the engine. In such an arrangement, it is necessary to preserve a considerably large distance between the intake and exhaust valves. Thus, this arrangement not always contributes to the reduction of size of the engine.

Usually, a recoil starter is attached to the aforementioned cooling fan case which in turn is attached to the engine body by means of bolts. Therefore, it is extremely difficult to attach the cooling fan case in a manner to avoid vibration. Thus, the cooling fan case poses a problem of noise, as well as increase of production cost. The same applies also to the attaching of a fuel tank to the engine body. Namely, the number of parts is increased, as well as the production cost, to require a complicated and troublesome assembling work.

SUMMARY OF THE INVENTION

It is, therefore, a major object of the invention to provide an air cooled internal combustion engine having a reduced size as compared with conventional engines while preserving an equivalent performance to the latter.

It is another object of the invention to provide an air cooled internal combustion engine having a compact construction as a whole but the capacities of intake air cleaner and exhaust silencer are increased to avoid the deterioration of the engine performance.

It is still another object of the invention to provide an air cooled diesel engine in which the arrangement and construction of tappets for the intake valve and exhaust valve, as well as tappet for fuel injection valve, are improved to make compact the construction of the engine as a whole.

It is a further object of the invention to provide an air cooled internal combustion engine in which the anti-vibration structure for attaching the cooling fan case to the engine body is improved to reduce the level of the noise.

It is a still further object of the invention to provide an air cooled internal combustion engine in which the anti-vibration construction for attaching the fuel tank to the engine body is improved to facilitate the assembling.

It is a still further object of the invention to provide an air cooled internal combustion engine having an exhaust silencer which has a compact construction and improved mechanical strength.

To these ends, according to the invention there is provided an air cooled internal combustion engine which comprises: a cooling fan integral with a flywheel which is fixed to one end of an engine crank shaft; a fan case covering the outside of the cooling fan and adapted for guiding the cooling air generated by the cooling fan to the engine body; an air cleaner connected to a suction port of the engine; and a silencer connected to an exhaust port of the engine; wherein the suction port is located at the same side of the engine body as the flywheel, while the exhaust port is located at the opposite side of the engine body to the flywheel, and wherein the air cleaner is formed integrally with the fan case.

These and other objects of the invention will be more fully understood from the following description of the invention on reference to the illustrations appended hereto.

DESCRIPTION OF THE PREFERRED EMBODIMENTS

The above-mentioned drawings show diesel engines as an example of an air cooled internal combustion engine. A cooling fan 2A is unitarily provided on the outer surface of the flywheel 2 which in turn is fixed to one end of a crank shaft 1. The cooling fan 2A rotates unitarily with the flywheel 2 to generate flow of cooling air which cools both of cylinder head 3 and cylinder block 4. A plurality of cooling fins 4A are provided on the outer periphery of the cylinder block 4 to enhance the cooling effect. A piston 5 received by the cylinder block 4 is coupled to a connecting rod 6 which rotatively drives the crank shaft 1. A reference numeral 7 denotes a combustion chamber formed on the top of the piston 5.

The cylinder head 3 is provided with a suction port 8 and an exhaust port 9 formed therein. The suction port 8 is communicated with the combustion chamber 7 through a suction valve 10, while the exhaust port 9 is communicated with the combustion chamber 7 through the exhaust valve 11.

As the suction valve 10 is opened, air A is induced into the combustion chamber 7 through the suction port 8 and the gas generated as a result of combustion is discharged to the silencer 17 through the exhaust port 9 as the exhaust valve 5 opens in the exhaust stroke. A reference numeral 12 denotes a fuel injection nozzle.

A recoil starter 13 is fixed to the outside of crank shaft 1 to which fixed is the flywheel 2, so as to be supported by a bracket 14. The bracket 14 is fixed to the engine body by means of bolts 15.

A cooling fan case 16 is fixed to the engine body so as to cover the cooling fan 2A formed on the outer surface of the flywheel 2. The fan case 16 is formed as a body separate from the bracket 14 and permits the latter to project outside through the center thereof, and is pressed against the engine body through a medium of a vibration damping member 19 such as rubber by means of elastic rings 21 stretched between hooks 20A formed on the periphery thereof and hooks 20B formed on the corresponding portions of the engine body.

Since the bracket 14 in support of the recoil starter 13 is formed separately from the cooling fan case 16, no load is applied to the cooling fan case 16 so that it is possible to fix the cooling fan case 16 to the engine body by means of the simple attaching structure employing elastic rings 21 through a medium of vibration damping member 19 and to suppress the generation of noise by the cooling fan case 16.

Figure 5:
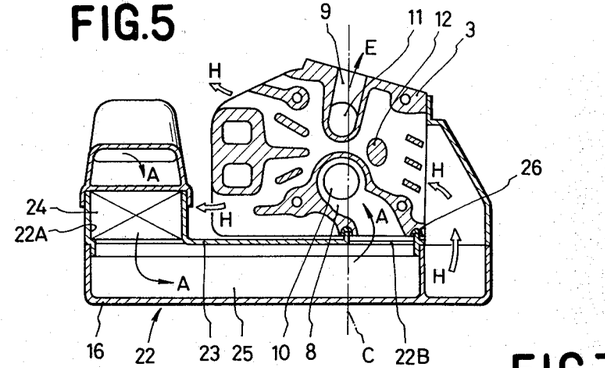
FIG. 5 is a sectional view taken along the line V—V of FIG. 1.

The inner surface of the cooling fan case 16 serves to guide the cooling air. In addition, a partition plate 16A is formed at the inside of the cooling fan case 16 as shown in FIG. 5. The partition plate 16A acts to separate the cooling air generated by the cooling fan 2A into two fractions, one of which is sent to the cylinder head 3 as shown by an arrow H while the other is directed to the cylinder block 4 as shown by arrow L to cool the cylinder head 3 and the cylinder block, respectively.

As shown in FIG. 5, the cooling air directed to the cylinder head 3 is introduced substantially at a right angle to the central axis C of the crank shaft 1 and effectively cools the fuel injection nozzle 12, the suction port 8, the exhaust port 9 and so forth. Particularly, the cooling air of low temperature is first of all supplied to the fuel injection nozzle 12 to effectively avoid the overheating of the nozzle. Meanwhile, the cooling air directed toward the cylinder block 4 flows along a cowling 18 in the direction of the central axis C of the crank shaft 1 to cool the cylinder block 4. In this connection, it is to be noted that the outer periphery of the push rod cover 4B formed unitarily with the cylinder block 4 plays the role of a guide for the cooling air to contribute to the simplification of the construction of the engine as a whole.

Figures 6, 7, 8:
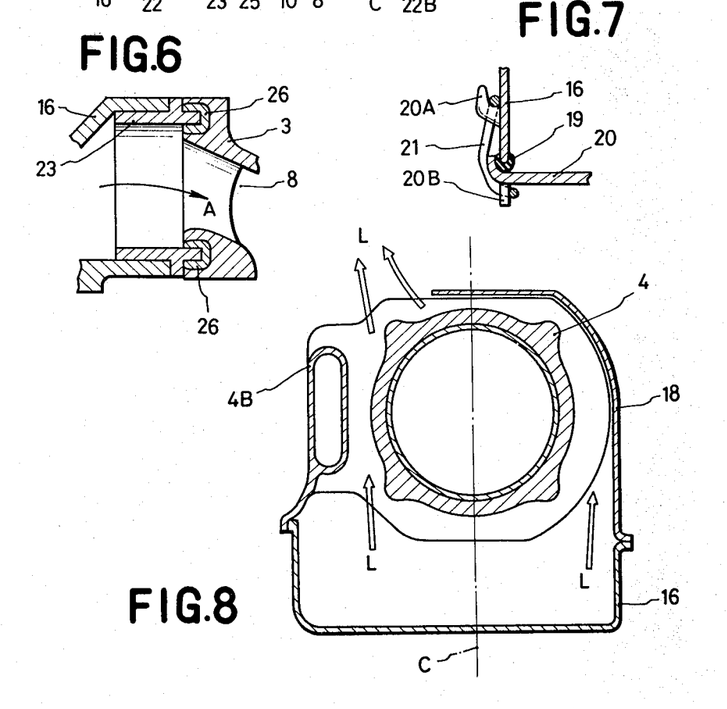
FIG. 6 is an enlarged sectional view of a portion of the engine shown in FIG. 1 around the suction port.
FIG. 7 is a sectional view taken along the line VII—VII of FIG. 3.
FIG. 8 is a cross-sectional view of the cylinder body of the engine shown in FIG. 1.

An air cleaner 22 is formed on the upper part of the cooling fan case 16 unitarily with the latter. Thus, the cooling fan case 16 and the air cleaner 22 can advantageously be formed integrally with each other from a plastic. A cover member 23 is attached to the opened side of the air cleaner 22 to form a sealing construction. A cleaner element constituted by a filter or the like is attached to a bore 23A provided at one end of the cover member 23, while a bore 23B communicating with the suction port 8 in the cylinder head 3 is formed at the other end of the cover member 23. Further, an intake passage 25 is formed between the cleaner element 24 and the bore 23B. As will be seen from FIG. 6, a packing 26 is placed in the bore 23B which constitutes the outlet of the intake passage 25, and is held in close contact with the suction port 8. The arrangement is such that the air is supplied after the removal of dust by the cleaner element 24 to the suction port 8 via the intake passage 25 and is introduced into the combustion chamber 7 as the suction valve 10 is lifted.

Since the air cleaner 22 is formed unitarily with the cooling fan case 16 as stated above, it becomes possible to install the air cleaner 22 at the same side as the suction port 8, i.e., at the opposite side of the engine body to the silencer 17. In consequence, the mutual spatial interference between the air cleaner 22 and the silencer 17 is avoided so that it is possible to preserve sufficiently large capacities of the air cleaner 22 and the silencer 17 in spite of the reduced size of the engine. It is, therefore, possible to improve the performance of the engine.

Figure 9:
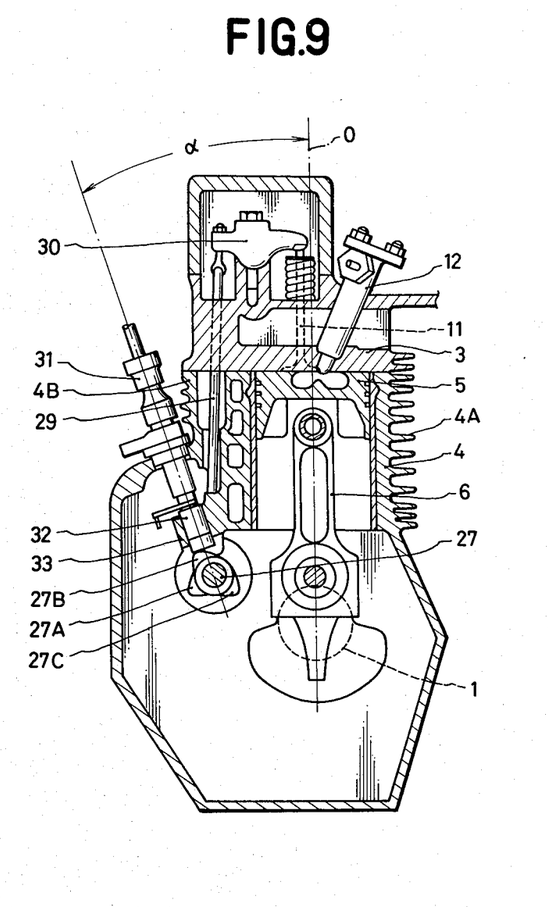
FIG. 9 is a longitudinal sectional view of the engine in a plane perpendicular to the section shown in FIG. 1.

As will be seen from FIG. 9, a cam shaft 27 is disposed in the engine to extend in parallel with the crank shaft 1 and is adapted to be driven by the crank shaft 1 through meshing gears. Cams 27A, 27B and 27C are fixedly disposed on the cam shaft 27 at predetermined distances from one another. The cam 27C is adapted to lift a tappet 28C which in turn lifts a push rod 29C. The push rod 29C then lifts the associated end of a valve arm 30C thereby to open the exhaust valve 11. Similarly, the cam 27A acts to open the suction valve 10 through actuating the associated tappet 28A, push rod and valve arm 30A. The cam 27B is adapted to actuate a tappet 32 which in turn actuates a fuel injection pump 31. A reference numeral 33 denotes a base member which guides the tappet 32.

The push rod cover 4B freely receiving the push rod 29 is formed by casting integrally with the cylinder block 4.

Figure 10:
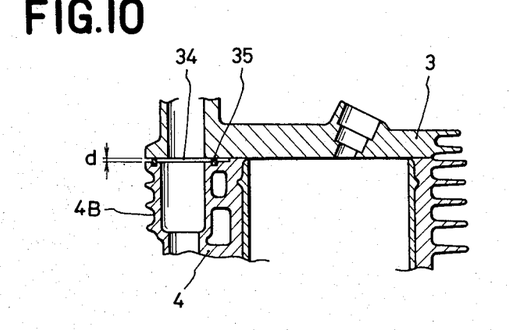
FIG. 10 is an enlarged sectional view of the portion of the engine shown in FIG. 9 around the push rod cover.
Figure 11:
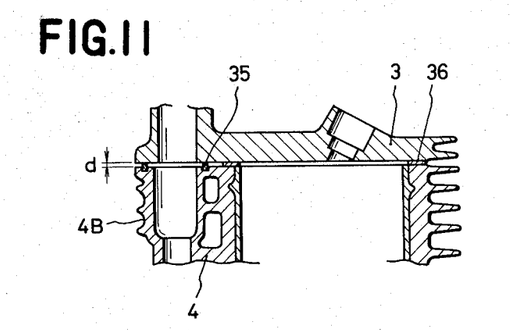
FIG. 11 is an enlarged longitudinal sectional view of the push rod cover of the engine in accordance with another embodiment of the invention.
Figure 12:
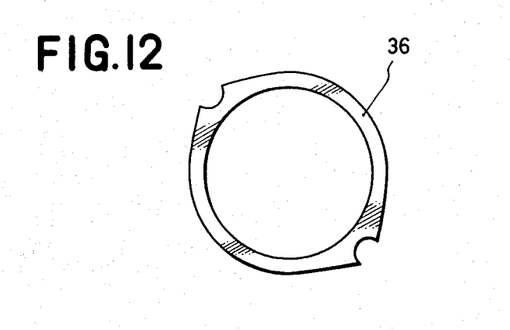
FIG. 12 is a plan view of the gasket packing used in the embodiment shown in FIG. 11.

As shown in FIG. 10, the top surface of the push rod cover 4B is spaced from the lower face of the cylinder head 3 by a gap 34 which receives an O-ring 35 for sealing the space between the top surface of the push rod cover 4B and the lower face of the cylinder head 3. The depth d of the gap 34 is selected to be 0.1 to 0.5 mm. It is possible to preserve the gap by interposing a gasket packing 36 as shown in FIG. 12 between the top surface of the cylinder block 4 and the lower surface of the cylinder head 3 as shown in FIG. 11, insteadly of forming the gap 34.

The push rod cover 4B, which is formed by casting integrally with the cylinder block 4, performs a function of reinforcement member and eliminates the problem of oil leak which is experienced in the conventional engines in which the push rod cover 4B is formed separately from the cylinder block 4. Also, the simplification of the engine construction is reduced thanks to the reduction of number of parts. Furthermore, since the gas-tightness is required only around the cylinder, the area of the packing is reduced to diminish the tightening force of the head bolts.

Figure 13:
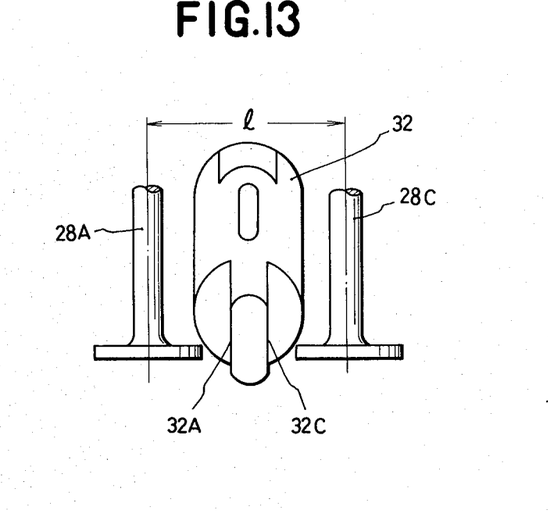
FIG. 13 is a front elevational view showing how the tappets for the suction valve, fuel injection valve and the exhaust valve are arranged.
Figure 14:
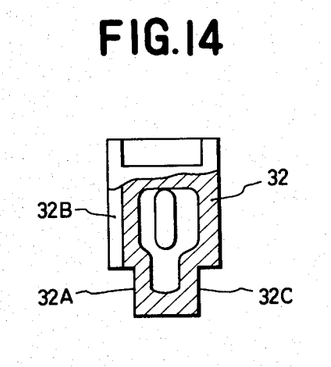
FIG. 14 is a partly sectioned front elevational view of the tappet for fuel injection pump.

FIG. 13 shows how the cams 27A, 27B and 27C are arranged in relation to the associated tappets, i.e., the tappets 28A for suction valve 10, tappet 32 for fuel injection pump 31 and the tappet 28C for the exhaust valve 11. Namely, the tappet 32 for the fuel injection pump 31 is disposed between the tappets 28A and 28C for the suction and exhaust valves 10 and 11. The end of the tappet 32 is notched at its both sides as at 32A and 32C to clear the mushroom portions of the tappets 28A and 28C. In consequence, the transverse distance l between the axes of tapped 28A and 28C is reduced considerably.

Figure 15:
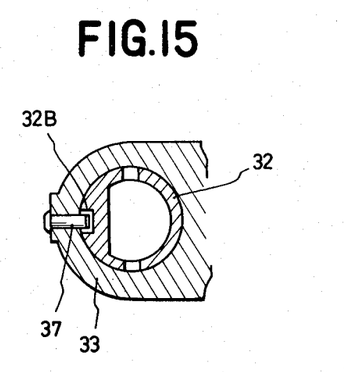
FIG. 15 is a cross-sectional view of the tappet for fuel injection pump at a portion thereof fitting a boss.

At the same time, an axial groove 32B is formed in the side surface of the tappet 32 which is adapted to engage the end of a knock pin 37 fixed to the boss member 33, when the tappet 32 is fitted to the boss member 33 as shown in FIG. 15, thereby to prevent the boss member 33 from being rotated. Also, a fuel injection pump 31 is disposed in a plane containing the axis O of the cylinder and is disposed to make an acute angle α to the axis of the cylinder.

The disposal of the fuel injection pump 31 in the plane containing the axis of the cylinder at an acute angle to the latter contributes, in cooperation with the reduction of the distance between the tappets 28A and 28C for the suction and exhaust valves, to the reduction of the size of the engine.

Figure 16:
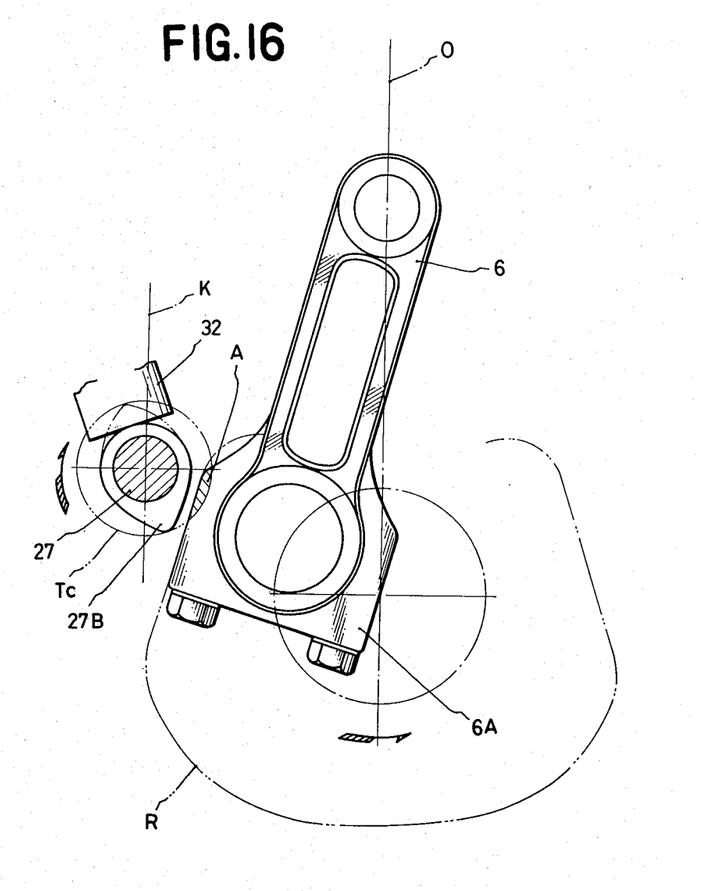
FIG. 16 shows a positional relationship between the suction or exhuast valve tappet and the connecting rod of the engine.

Further, according to the invention, the central axis K of the cam shaft 27 is positioned close to the central axis O of the cylinder, so that the locus of movement of outermost end of the cam 27B for the tappet 32 and the locus of movement of the outer end of big end 6A of the connecting rod 6 overlap each other in the hatched area A as the crank shaft 1 rotates. The shafts 1 and 27 are adapted to be rotated in synchronism to avoid the mutual interference between the outermost end of the cam 27B and the big end 6A of the connecting rod 6. It is, therefore, possible to reduce the distance between the crank shaft 1 and the cam shaft 27 by an amount corresponding to the aforementioned overlap, to contribute to the reduction of the engine size.

A fuel tank 38 is fixed at its one end to the engine body by bolts 40 and at its other side by means of elastic rings 41 stretched between hooks 38A attached to the fuel tank 38 and hooks 14A provided on the bracket 14 fixed to the engine body, with a vibration damping member 39 of rubber or the like interposed between the fuel tank and the cooling fan case 16. This arrangement effectively suppresses the vibration of the fuel tank 38 because of the provision of the vibration damping member 39 and the elastic rings 41 and, in addition, facilitates the assembling.

Figure 17:
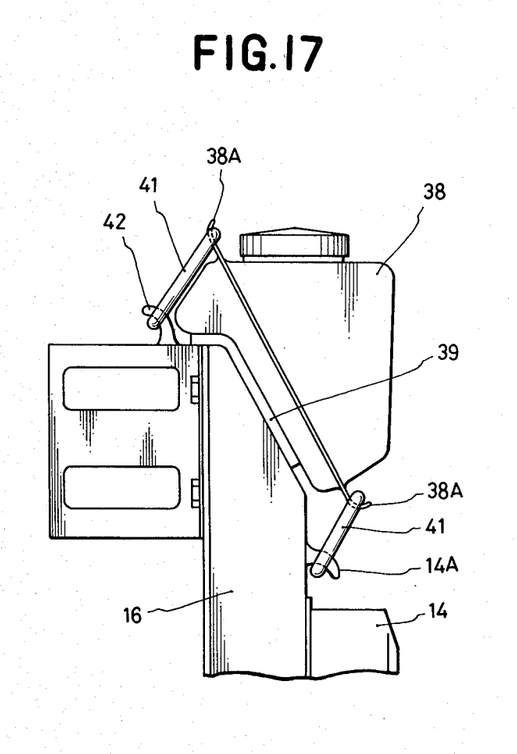
FIG. 17 is a front elevational view of another embodiment showing an example of the structure for attaching the fuel tank to the engine body.

FIG. 17 shows another arrangement for attaching the fuel tank to the engine body. In this case, elastic rings 41 stretched between hooks 42 formed on the engine body and the hooks 38A on the fuel tank are used in place of the above-mentioned bolts 40 for fixing one end of the fuel tank.

Figure 1:
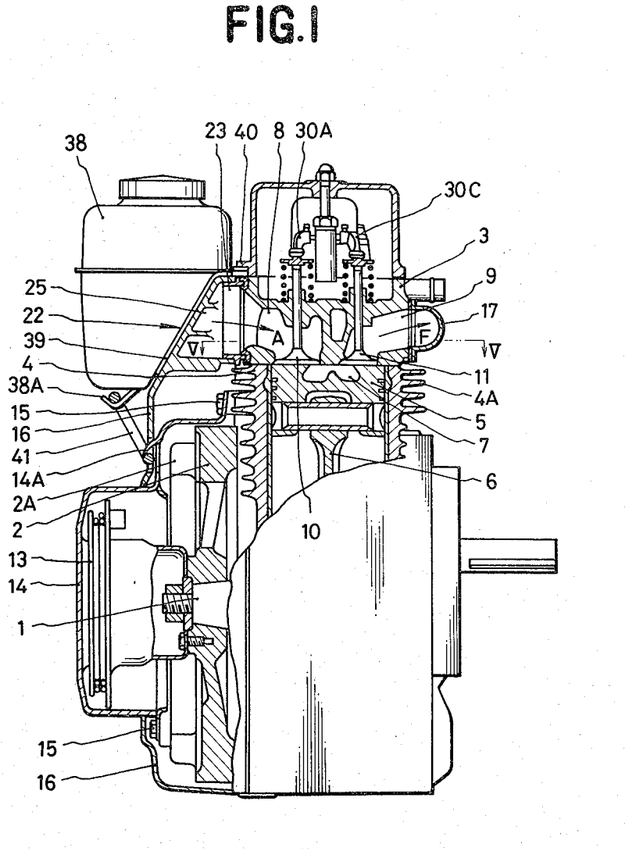
FIG. 1 is a partly sectional front elevational view of an air cooled internal combustion engine in accord with an embodiment of the invention.
Figure 2:
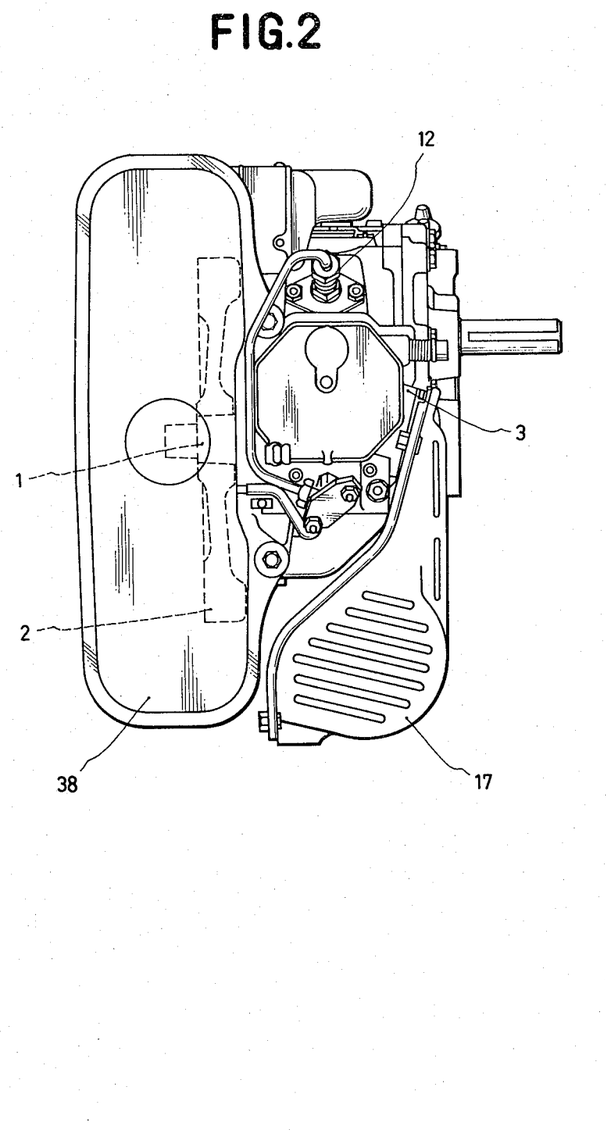
FIG. 2 is a plan view of the engine.
Figure 3:
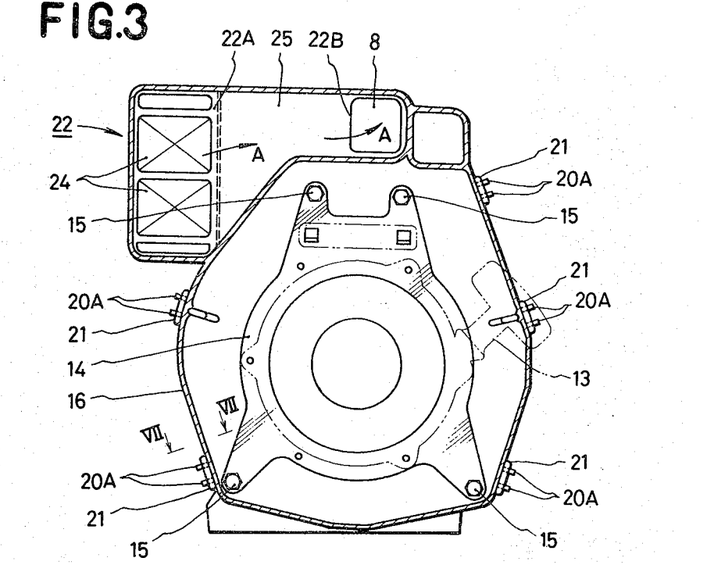
FIG. 3 is a sectional front elevational view of a cooling fan case of the engine.
Figure 4:
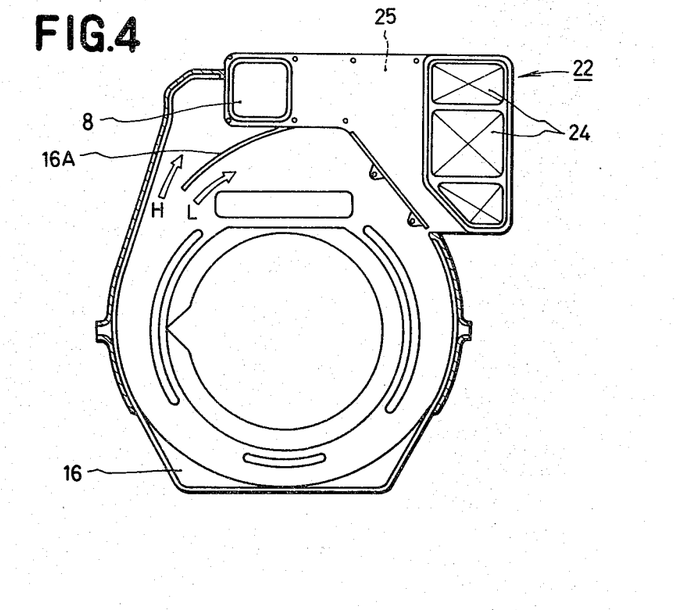
FIG. 4 is a front elevational view of the inside of cooling fan case of the engine.

The silencer 17 is attached to a flange 9A formed at the outlet of the exhaust port 9 at an inclination to the axis of the crank shaft 1 as shown in FIG. 2, so that the rear end of the silencer 17 is inclined toward the engine body to decrease the size of the engine as a whole.

Figure 18A:
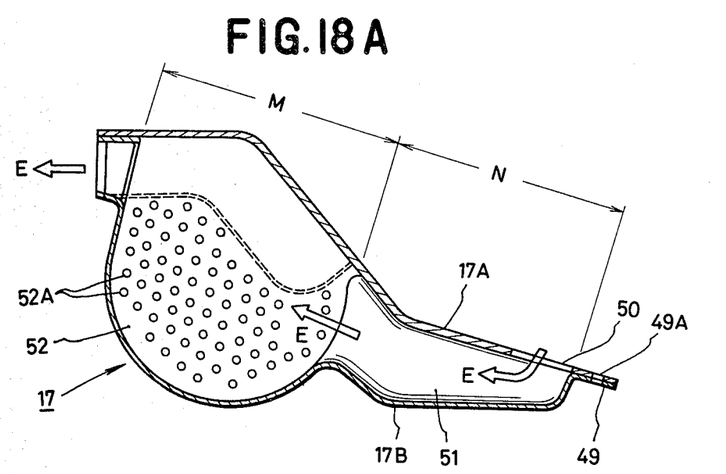
FIGS. 18A and 18B are a cross-sectional view and a longitudinal sectional view of a silencer adapted to be attached to the internal combustion engine of the invention.
Figure 18B:
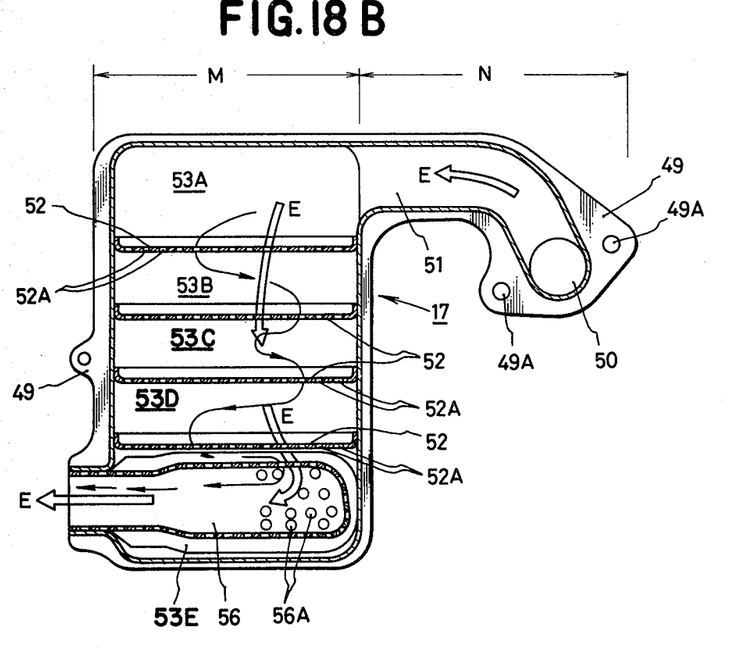

As shown in FIGS. 18A and 18B, the silencer 17 has a split construction constituted by a member 17A which is disposed at the same side as the engine and another member 17B disposed at the opposite side to the engine. These members are united to each other by welding at the flange portion 49. Each of the members 17A and 17B has a main body portion represented by M and an elbow portion represented by N. The member 17A disposed at the same side as the engine is shaped simply by effecting a bending and punching on a flat sheet, while the member 17B disposed at the opposite side to the engine has a gas passage 51 which extends from the introduction, or inlet, port 50 for introducing the exhaust gas E from the exhaust port 9 to the elbow portion N, as well as the main body portion M, formed by a drawing.

The space in the main body portion M of the silencer 17 is divided into a plurality of stages by means of partition walls 52 having a multiplicity of apertures, 52A to form chambers 53A, 53B, 53C, 53D and 53E. The partition walls 52 are fixed to the inner surface of the main body portion M by welding or caulking. An end pipe 56 welded to the member 17A communicates with the chamber 53E of last stage and projects to the outside of the silencer. A multiplicity of apertures 56A are formed in the portion of the end pipe 56 within the chamber 53E. The end pipe 56 is formed from a plate material by a press work. The silencer 17 having the described construction is fixed to the flange 9A of the exhaust port 9 by means of bolts which are received by bolt holes 49A formed in the flange 49.

The exhaust gas E introduced through the introduction port 50 flows into the chamber 53A via the exhaust gas passage 51 and flows through the successive chambers 53B, 53C, 53D and 53E being subjected to restriction and expansion alternatingly and repeatedly and is finally discharged to the atmosphere through the end pipe 56.

Since the silencer 17 has a split construction constituted by two members which are joined to each other at the flanges 49, the flanges 49 conveniently act as a reinforcement rib to increase the rigidity and strength of the silencer 17. In addition, since the main body portion M and the elbow portion N are formed integrally, the number of parts, as well as the number of welding portions, is reduced to realize a silencer of low production cost and reduced leak of gas.

Figure 19A:
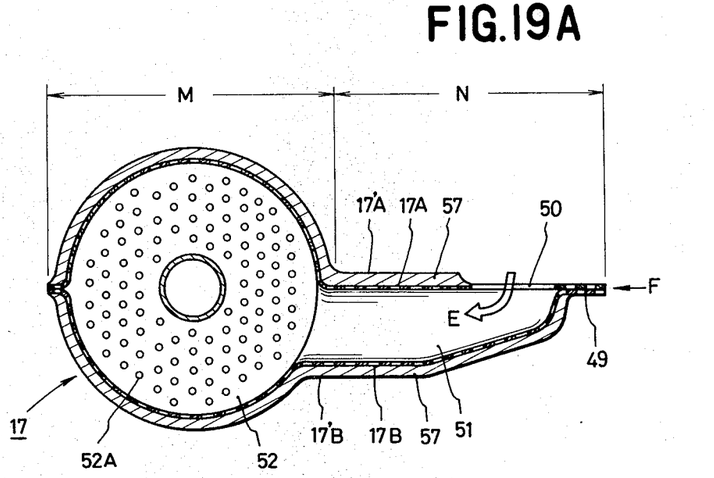
FIGS. 19A and 19B are a cross-sectional view and a longitudinal sectional view of the silencer in accordance with another embodiment of the invention.
Figure 19B:
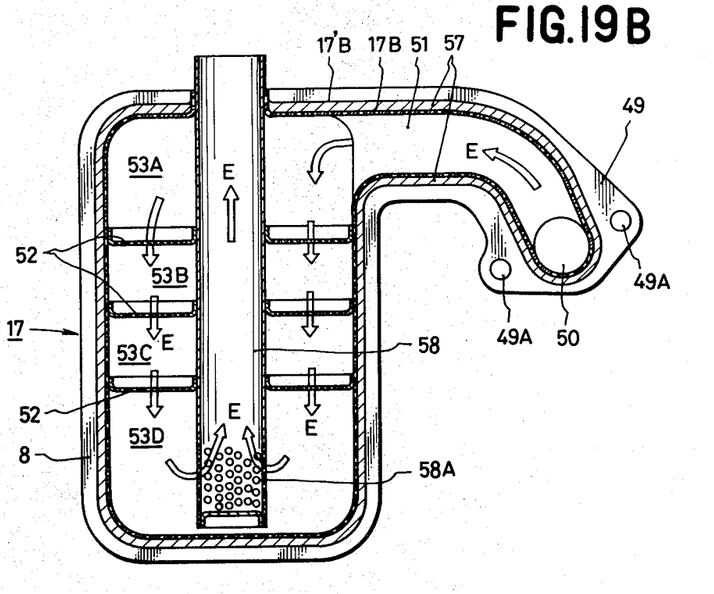

FIGS. 19A and 19B show another example of the silencer 17 in which the silencer 17 has a split construction constituted by a member 17A disposed at the same side as the engine and another member 17B disposed at the opposite side to the engine. In addition, outer shell members 17'A and 17'B are coupled to each other so as to surround the members 17A and 17B. Sound absorbing member 57 is disposed in the space between the members 17A and 17'A, as well as in the space between the members 17B and 17'B. As in the case of the example explained above, a plurality of partition walls 52 having a multiplicity of apertures 52A are welded to the inside of the main body portion M to divide the space in the latter into a plurality of stages of chambers 53A, 53B, 53C and 53D. A cylindrical pipe 58 disposed in the central portion of the main body portion M extends from the chamber 53D upwardly to communicate with the outside of the silencer. A port 58A for introducing the exhaust gas E is formed at the lower end of the cylindrical pipe 58.

Figure 20A:
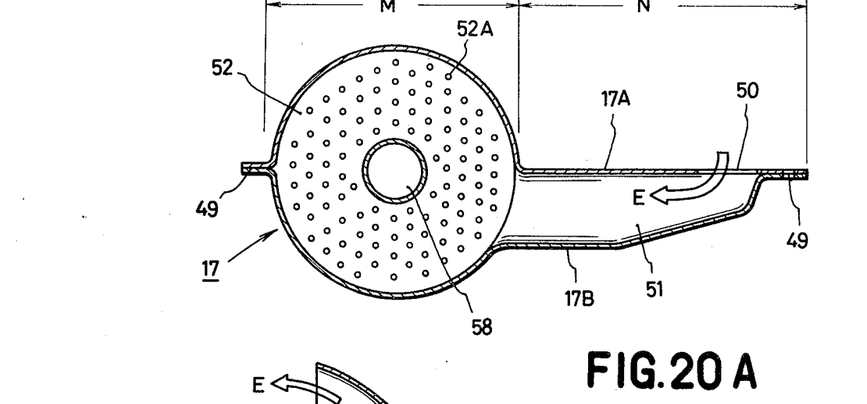
FIGS. 20A and 20B are a cross-sectional view and a longitudinal sectional view of the silencer in accordance with still another embodiment of the invention.
Figure 20B:
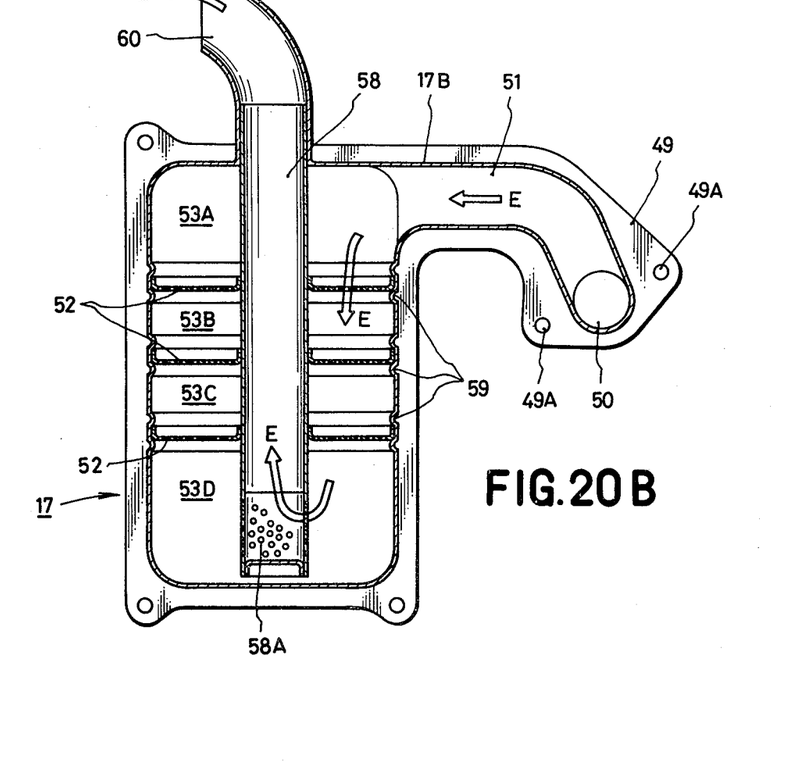

In the still another example shown in FIGS. 20A and 20B, a plurality of caulk grooves 59 are formed in the main body portion M in the course of formation of the members 17A and 17B by press work. The partition walls 52 are held by these caulk grooves 59. Further, a discharge pipe 60 is attached to the end of the cylindrical pipe 58.

Figure 21A:
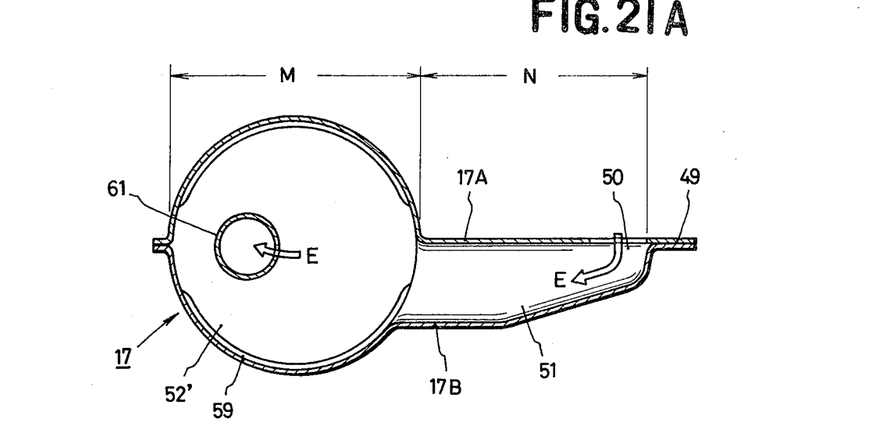
FIGS. 21A, 21B and 21C are a cross-sectional view, a longitudinal sectional view and a sectional view taken along the line XXI—XXI of FIG. 21B, respectively, of the silencer in accordance with a further embodiment of the invention.
Figures 21B, 21C:
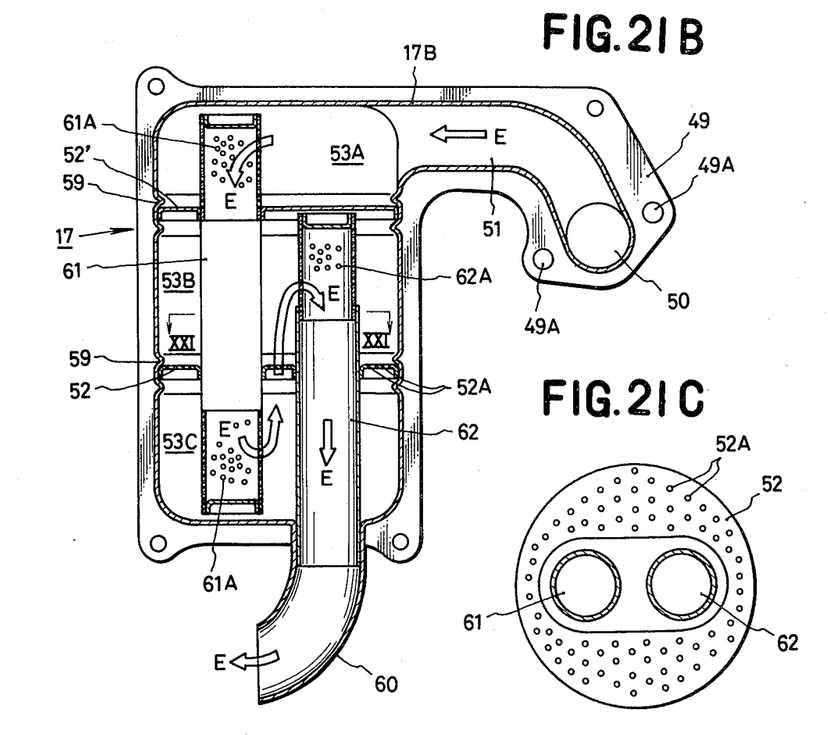

In the further example shown in FIGS. 21A to 21C, upper partition walls 52' having no apertures and lower partition wall 52 having apertures 52A are held by caulk grooves 59 formed in the main body portion M to form three chambers, i.e., an upper chamber 53A, intermediate chamber 53B and a lower chamber 53C in the space within the main body portion M.

The chambers 53A and 53C are communicated with each other by means of a cylindrical pipe 61, while the chamber 53B is communicated with the ambient air through another cylindrical pipe 62. Therefore, the cylindrical pipe 61 is provided with apertures 61A only at the portion thereof corresponding to the chamber 53B. Therefore, in the silencer 17 of this example, the exhaust gas E coming through the introduction port 50 flows from the chamber 53A to the chamber 53C through the cylindrical pipe 61 and then flows into the chamber 53B through the apertures 52A formed in the partition wall 52. Finally, the exhaust gas E is discharged to the outside of the silencer through the cylindrical inlet pipe 62.

In each of the examples of silencer explained above, the flanges 49 act as reinforcement rib to increase the rigidity and mechanical strength of the silencer. In addition, since the members 17A and 17B have main body portion and elbow portion constructed integrally with each other, the number of parts, as well as the number of welding points, is reduced advantageously.

As has been described, in the air cooled internal combustion engine of the invention, the air cleaner is constructed integrally with the cooling fan case which covers the cooling fan, so that it is possible to arrange the air cleaner and the silencer at the opposite sides of the engine body. In consequence, the air cleaner and the silencer are allowed to have sufficiently large capacities to make it possible to realize a compact construction of the engine without being accompanied by the reduction of the engine performance. Further, the generation of noise by the cooling fan case is suppressed because the latter is supported through elastic member independently of the supporting bracket for the recoil starter. For the same reason, the assembling is considerably facilitated. Furthermore, the construction and arrangement of the tappets, cams for actuating the tappets and the silencer are reasonably improved to effectively realize the compact construction of air cooled internal combustion engine.

What is claimed is:

1. An air cooled internal combustion engine comprising: a cooling fan unitarily formed on a flywheel fixed to one end of an engine crank-shaft, a cooling fan case adapted to cover said cooling fan and to guide the flow of cooling air generated by said cooling fan towards the engine body, an air cleaner connected to a suction port of said engine, and a silencer connected to an exhaust port of said engine wherein said suction port is located on the same side of said engine as said flywheel, while said exhaust port is located on the opposite side of said engine from said flywheel, and wherein said air cleaner is formed unitarily with said cooling fan case, the space in said cooling fan case being divided into two passages by a partition plate, one of said passages being adapted to guide the flow of cooling air generated by said cooling fan to the cylinder head of said engine body in a direction perpendicular to the crank-shaft axis of said engine, while the other being adapted to guide said flow of cooling air to the cylinder block of said engine in a direction substantially parallel to the crank-shaft axis of said engine.

2. An air cooled internal combustion engine comprising: a cooling fan unitarily formed on a flywheel fixed to one end of an engine crankshaft, a cooling fan case adapted to cover said cooling fan and to guide the flow of cooling air generated by said cooling fan towards the engine body, an air cleaner connected to a suction port of said engine, and a silencer connected to an exhaust port of said engine wherein said suction port is located on the same side of said engine as said flywheel, while said exhaust port is located on the opposite side of said engine from said flywheel, and wherein said air cleaner is formed unitarily with said cooling fan case, and     a tappet for a fuel injection pump disposed between a tappet for suction valve and a tappet for exhaust valve, which are adapted to be actuated by respective cams provided on a cam-shaft driven by said engine crank, said engine being of the diesel type.

3. An air cooled internal combustion engine as claimed in claim 2, wherein the locus of movement of the outermost end of the cam for actuating said tappet for said fuel injection pump overlaps the locus of movement of the outermost end of big end of the connecting rod, and wherein the rotation timing is so selected as to avoid the mutual interference between said big end of said connecting rod and said cam during the engine operation.

4. An air cooled internal combustion engine comprising: a cooling fan unitarily formed on a flywheel fixed to one end of an engine crank-shaft, a cooling fan case adapted to cover said cooling fan and to guide the flow of cooling air generated by said cooling fan towards the engine body, an air cleaner connected to a suction port of said engine, and a silencer connected to an exhaust port of said engine wherein said suction port is located on the same side of said engine as said flywheel, while said exhaust port is located on the opposite side of said engine from said flywheel, and wherein said air cleaner is formed unitarily with said cooling fan case; and a fuel tank pressed and fixed to said engine by elastic force of elastic members with a vibration damping member interposed therebetween.

5. An air cooled internal combustion engine comprising: a cooling fan unitarily formed on a flywheel fixed to one end of an engine crank-shaft, a cooling fan case adapted to cover said cooling fan and to guide the flow of cooling air generated by said cooling fan towards the engine body, an air cleaner connected to a suction port of said engine, and a silencer connected to an exhaust port of said engine wherein said suction port is located on the same side of said engine as said flywheel, while said exhaust port is located on the opposite side of said engine from said flywheel, and wherein said air cleaner is formed unitarily with said cooling fan case; and a flange surface formed at said exhaust port and inclined to the axis of said engine crank-shaft and, said silencer being attached to said flange surface at an inclination toward said engine body.

6. An air cooled internal combustion engine comprising: a cooling fan unitarily formed on a flywheel fixed to one end of an engine crank-shaft, a cooling fan case adapted to cover said cooling fan and to guide the flow of cooling air generated by said cooling fan towards the engine body, an air cleaner connected to a suction port of said engine, and a silencer connected to an exhaust port of said engine wherein said suction port is located on the same side of said engine as said flywheel, while said exhaust port is located on the opposite side of said engine from said flywheel, wherein said air cleaner is formed unitarily with said cooling fan case, wherein said silencer has a split construction and comprises a first shell portion having one side facing said engine body and a second shell portion attached to the opposite side of the first shell portion, each of said shell portions having an elbow portion for communication with said exhaust port and a main body portion for connection to said elbow portion, said elbow portion and said main body being integrally formed, and wherein said main body portion has a plurality of stages of spaced partition walls having a multiplicity of apertures and a cylindrical pipe which extends to the outside of said main body portion through said stages of partition walls having apertures.

7. An air cooled internal combustion engine comprising: a cooling fan unitarily formed on a flywheel fixed to one end of an engine crank-shaft, a cooling fan case adapted to cover said cooling fan and to guide the flow of cooling air generated by said cooling fan towards the engine body, an air cleaner connected to a suction port of said engine, and a silencer connected to an exhaust port of said engine wherein said suction port is located on the same side of said engine as said flywheel, while said exhaust port is located on the opposite side of said engine from said flywheel, wherein said air cleaner is formed unitarily with said cooling fan case, wherein said silencer has a split type construction and comprises a first shell portion having a side facing said engine body and a second shell portion attached to the opposite side of the first shell portion, each of said shell portions having an elbow portion for communication with said exhaust port and a main body portion for connection to said elbow portion said elbow portion and said main portion being integrally formed, and wherein said main body portion has a plurality of stages of spaced partition walls having a multiplicity of apertures, said partition walls being fixed by caulking in caulking grooves formed in the wall of said main body portion, and a cylindrical pipe extending to the outside of said main body portion through said stages of partition walls.

8. An air cooled internal combustion engine comrising:

a cooling fan unitarily formed on a flywheel fixed to one end of an engine crank-shaft;

a cooling fan case adapted to cover said cooling fan and to guide the flow of cooling air generated by said cooling fan toward the engine body;

an air cleaner connected to a suction port of said engine;

a silencer connected to an exhaust port of said engine, wherein said suction port is located on the same side of said engine as said flywheel, while said exhaust port is located on the opposite side of said engine body from said flywheel, and wherein said air cleaner is formed unitarily with said cooling fan case; and a tappet for a fuel injection pump disposed between a tappet for a suction valve and a tappet for an exhaust valve, which valves are adapted to be actuated by respective cams provided on a cam shaft driven by the engine crankshaft, said tappet for said fuel injection pump being notched at its both sides to receive parts of said tappets for said suction and exhaust valves to clear said tappets for said suction and exhaust valves, said engine being of the diesel engine type.

9. An air cooled internal combustion engine as claimed in claim 8 wherein the locus of movement of the outermost end of the cam for actuating said tappet for said fuel injection pump overlaps the locus of movement of the outermost end of the big end of the connecting rod, and wherein the rotation timing is so selected as to avoid the mutual interference between said big end of said connecting rod and said cam during the engine operation.

* * * * *